US008258639B2

(12) United States Patent
Labbe et al.

(10) Patent No.: US 8,258,639 B2
(45) Date of Patent: Sep. 4, 2012

(54) TWO-PHASE CONTACTOR FOR STARTING DEVICE FOR INTERNAL COMBUSTION ENGINE

(75) Inventors: Nicolas Labbe, Lyon (FR); Stéphane Plaideau, Lyon (FR); Yannick Parvery, Lyon (FR)

(73) Assignee: Valeo Equipements Electriques Moteur, Creteil (FR)

( * ) Notice: Subject to any disclaimer, the term of this patent is extended or adjusted under 35 U.S.C. 154(b) by 358 days.

(21) Appl. No.: 12/423,270

(22) Filed: Apr. 14, 2009

(65) Prior Publication Data

US 2009/0267553 A1 Oct. 29, 2009

(30) Foreign Application Priority Data

Apr. 15, 2008 (FR) .................................... 08 52529

(51) Int. Cl.
*H02P 9/04* (2006.01)
*F02N 11/04* (2006.01)

(52) U.S. Cl. ....................... 290/38 A; 290/38 R; 290/48

(58) Field of Classification Search ................. 290/38 A
See application file for complete search history.

(56) References Cited

U.S. PATENT DOCUMENTS 2,233,595 A * 3/1941 Elkin .......................... 290/38 R
4,551,630 A * 11/1985 Stahura et al. ............. 290/38 A
5,731,638 A * 3/1998 Niimi .......................... 290/38 R
5,892,421 A * 4/1999 Matsushima ............... 290/38 R
6,148,781 A 11/2000 Boegner et al.
7,804,180 B2 * 9/2010 Labbe et al. ................ 290/38 R

FOREIGN PATENT DOCUMENTS

JP 04 094459 A 3/1992
WO WO 2006082306 A1 * 8/2006

OTHER PUBLICATIONS

Machine translation of WO 2006082306 A1.*

* cited by examiner

*Primary Examiner* — Quyen Leung
*Assistant Examiner* — Michael Andrews
(74) *Attorney, Agent, or Firm* — Berenato & White, LLC

(57) ABSTRACT

A starting device for an internal combustion engine, especially that of a motor vehicle, comprises:

a stator, or inductor, comprising an inductor coil (5), said inductor coil comprising at least first (43), second (41) and third (42) windings that are all electrically connected in parallel;

a rotor associated with said stator and having a longitudinal axis;

a starter element that can be rotated by the rotor; and a contractor designed to supply power, in a prerotation first phase, only to the first winding (43) of the inductor coil and, in a full-speed second phase, following the first phase, to the first, second and third windings (41, 42) of the inductor coil.

10 Claims, 7 Drawing Sheets

TWO-PHASE CONTACTOR FOR STARTING DEVICE FOR INTERNAL COMBUSTION ENGINE

This application claims foreign priority benefit and right under 35 U.S.C. §119 based on French Patent application no. FR 0852529 filed Apr. 15, 2008, which is hereby incorporated by reference in its entirety.

BACKGROUND OF THE INVENTION

1. Field of the Invention

The invention relates in particular to a starting device for an internal combustion engine, especially that of a motor vehicle.

2. Description of Related Art

Patent FR 2 174 421 teaches an electromagnetic contractor for an electrical motor-vehicle starter. This contractor comprises a movable part consisting of a solenoid plunger, fastened to which is a rod bearing at one of its ends a slidably mounted contact plate. This plate initially bears, especially through the action of springs, on contacts of an electrical circuit that includes a coil resistor so that, in a first starting phase, the starter rotates at low speed. In a second starting phase, this same contact plate closes an electrical circuit, enabling the starter to deliver its maximum torque.

Patent FR 2 827 341 discloses an electromagnetic contractor with a power resistor, in order to prerotate the starter element.

Patent application FR 2 881 479 discloses a control device for a starter provided with an electric motor. The latter comprises a four-winding inductor coil forming two groups in parallel, each consisting of two windings in series. A delayed-action electromagnetic switch is provided so as, in a first phase, to activate only one of the groups of windings and, in a second phase, to activate both groups of windings.

Moreover, recent developments in diesel engines having a high cold resistive torque require starters that can produce a high peak torque in order to start this type of engine.

However, the higher the peak torque, the higher the risk of milling between a starter element of the starter and the starter ring gear of the internal combustion engine.

SUMMARY OF THE INVENTION

The aim of the invention is especially to solve the aforementioned drawback in a simple manner.

One subject of the invention is thus a starting device for an internal combustion engine, especially that of a motor vehicle, comprising:

- a starter element designed to start the internal combustion engine, especially via a ring gear;
- an electric motor designed to rotate the starter element;
- a contractor having a longitudinal axis and comprising first and second electrical contact elements designed to supply power to the electric motor, enabling the latter to operate in succession in a prerotation first phase and a full-speed second phase, each of the first and second contact elements being especially able to move along the longitudinal axis between an open state and a closed state.

Thanks to the invention, the first and second electrical contact elements may be easily positioned, if so required, in a single casing, thereby avoiding having to have two contractor casings as described especially in patent application FR 2 881 479.

The first and second electrical contact elements may, if so desired, be controlled according to displacements of elements of the device, independently of predetermined time constants.

In the prerotation first phase, the torque developed by the electric motor is lower than that developed in the full-speed second phase.

Optionally, after engaging the ignition key of the vehicle and before the prerotation first phase, the electric motor may already be at least partly supplied with electric current intended for a pull-in winding of the contractor. This may possibly result in a small rotation of the electric motor.

Advantageously, the contractor is designed so that, in the prerotation first phase, the first electrical contact element is in the closed state and the second electrical contact element is in the open state, while in the full-speed second phase the first and second contact elements are in a closed state.

Preferably, the contractor comprises a movable assembly designed to move the starter element by means of a pivoting fork, the movable assembly comprising an actuating element designed to close the second electrical contact element.

The contractor according to the invention may thus take up little space.

In one embodiment of the invention, the movable assembly of the contractor may comprise a movable core, the actuating element being mounted so as to move relative to this movable core against the force exerted by an elastic return element, especially a spring.

The second electrical contact element may be fastened, especially with the possibility of sliding, to a control rod and the actuating element of the movable assembly may be designed to be applied against the control rod so as to be able to push the latter in order to make the second electrical contact element pass from the open state to the closed state.

Advantageously, the first contact element is supported, especially with the possibility of sliding, by a movable support and the second contact element may be guided, by being moved in this support for the first contact element.

In one embodiment of the invention, the contractor comprises a fixed core, and an elastic return element, especially a spring, is interposed between the second contact element and the movable support of the first electrical contact element so as to make it possible, at least when the first contact element is activated and before activation of the second contact element, to apply the second electrical contact element against the fixed core of the contractor.

Preferably, the device includes a first electrical terminal connected to a stored energy source, especially a battery, an intermediate-power second terminal and a full-power third terminal.

Advantageously, in the prerotation first phase, the first contact element comes into contact with the first electrical terminal and the intermediate-power second terminal, while in the full-speed second phase, the second electrical contact element comes into contact with the first and third electrical terminals.

As the case may be, the first terminal connected to a stored energy source may be staged so as to enable the first and second contact elements to bear simultaneously on this first terminal, especially at various heights of said terminal.

In one embodiment of the invention, the device comprises a stator, or inductor, comprising an inductor coil, said inductor coil comprising at least first and second windings, and the contractor may be designed to supply power, in the prerotation first phase, only to the first winding of the inductor coil and, in the full-speed second phase, both to the first and second windings of the inductor coil.

As a variant, the device comprises at least one power resistor designed so that, in the prerotation first phase, the inductor coil is supplied with electric power through the power resistor, especially so as to limit the peak current in the electric motor, and, in the full-speed second phase, the inductor coil is electrically supplied by short-circuiting the power resistor.

Preferably, the contractor is designed so that the second electrical contact element is in the open state while the starter element is in position, tooth against tooth, on the starter ring gear of the internal combustion engine.

The invention makes it possible in particular to reduce the peak torque while the starter element is in position, tooth against tooth, on the ring gear, and thus to eliminate the risk of milling.

The invention may also prevent any reopening by return of the movable core that may occur in the case of a tooth-against-tooth position at the moment of conjunction (in which case a voltage drop due to the peak current of the electric motor and a short-circuiting of a pull-in winding of this contractor may induce a force insufficient for the movable core to undergo magnetic sticking).

In the first phase, the peak current is limited in the electric motor, thereby reducing the electrical wear of the brushes present in the electric motor. By limiting the peak torque it is possible to reduce the mechanical wear of the pinion against the ring gear.

At least one of the first and second electrical contact elements may include an electrically conducting plate.

In one embodiment of the invention, the device comprises:

- a stator, also called an inductor, comprising an inductor coil, said inductor coil comprising at least first, second and third windings all electrically connected in parallel;
- a rotor, also called an armature, associated with said stator and having a longitudinal axis; and
- the contractor being designed to supply power, in the prerotation first phase, only to the first winding of the inductor coil and, in the full-speed second phase, following the first phase, to the first, second and third windings of the inductor coil.

In one embodiment of the invention, the inductor comprises a coil having four windings in parallel, corresponding to four inductor pathways, thereby substantially cutting current and torque spikes.

The subject of the invention is also a rotating electrical machine, especially a reversible alternator or starter for a motor vehicle, comprising a device as described above.

Yet another subject of the invention is a method of starting an internal combustion engine, especially that of a motor vehicle, using a starting device provided with an electric motor, supplied with power via first and second electrical contact elements, the starting device further including a starter element capable of engaging on a ring gear fastened to the internal combustion engine, the method comprising the following steps:

- in a prerotation first phase, the electric motor is operated with a limited electric power; and then
- in a full-speed second phase, starting only when the starter element is engaged in the ring gear beyond the tooth-against-tooth position, the electric motor is operated at full speed.

Yet another subject of the invention is a starting device for an internal combustion engine, especially that of a motor vehicle, comprising:

- a stator, or inductor, comprising an inductor coil, said inductor coil comprising at least first, second and third windings all electrically connected in parallel;
- a rotor associated with said stator and having a longitudinal axis;
- a starter element that can be rotated by the rotor; and
- a contractor designed to supply power, in a prerotation first phase, only to the first winding of the inductor coil and, in a full-speed second phase, following the first phase, to the first, second and third windings of the inductor coil.

The windings of the inductor coil may, if so desired, be controlled by switches, especially electronic switches, of the contractor. These switches comprise for example at least one transistor or at least one thyristor.

As a variant, the windings of the inductor coil may be controlled by the movement of movable elements of the contractor.

According to one example of the invention, in the prerotation phase, only some of the windings of the inductor coil are supplied, for example one half or one quarter of the inductor coil, whereas in the full-speed second phase all the windings of the inductor coil are supplied.

In one embodiment of the invention, the inductor coil may comprise four windings forming two groups in parallel, each consisting of two windings in series.

Yet another subject of the invention is a starting device for an internal combustion engine, especially that of a motor vehicle, comprising:

- a stator, or inductor, comprising an inductor coil, said inductor coil comprising a plurality of windings, especially all electrically connected in parallel;
- a rotor associated with said stator and having a longitudinal axis;
- a starter element that can be rotated by the rotor; and
- a contractor designed to supply power, in a prerotation first phase, only to some of the windings of the inductor coil and, in a full-speed second phase, following the first phase, to all of the windings of the inductor coil, the number of windings activated in the second phase being strictly greater or smaller than twice the number of windings activated in the first phase.

For example, it is possible to activate a single winding in the first phase and six windings in the second.

As a variant, it is possible to activate four windings in the first phase and six in the second.

The invention also relates to a starting device for an internal combustion engine, especially that of a motor vehicle, comprising:

- a stator, or inductor, comprising an inductor coil, said inductor coil comprising more than four windings, especially all electrically connected in parallel;
- a rotor associated with said stator and having a longitudinal axis;
- a starter element that can be rotated by the rotor; and
- a contractor designed to supply power, in a prerotation first phase, only to some of the windings of the inductor coil and, in a full-speed second phase, following the first phase, to all of the windings of the inductor coil, the number of windings activated in the second phase being equal to twice the number of windings activated in the first phase.

For example, it is possible to activate three windings in the first phase and six in the second.

BRIEF DESCRIPTION OF THE DRAWINGS

The invention will be more clearly understood from reading the following detailed description of non-limiting embodiments of the invention and by examining the appended drawing in which.

DETAILED DESCRIPTION OF PREFERRED EMBODIMENTS

Figure 1:
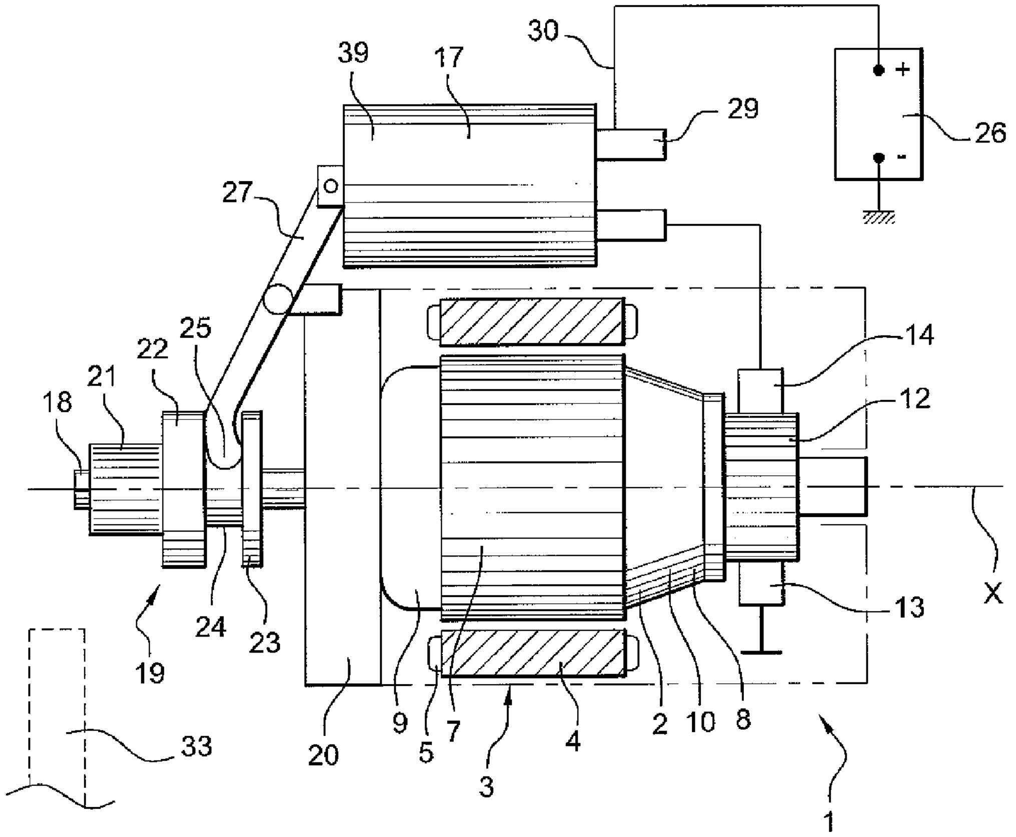
FIG. 1 shows, schematically and in part, a starting device according to one embodiment of the invention.

FIG. 1 shows a starting device 1 for the internal combustion engine of a motor vehicle.

This device comprises, on the one hand, a rotor 2, also called an armature, which can rotate about an axis X and, on the other hand, a stator 3, also called an inductor, around the rotor 2.

This stator 3 comprises a yoke to which one or more pole pieces 4 for positioning an inductor coil 5 are fixed.

The rotor 2 has a rotor body 7 and an armature winding 8 wound in notches of the rotor body 7.

The armature winding 8 forms, on either side of the rotor body 7, a front bundle 9 and a rear bundle 10.

To the rear, the rotor 2 is provided with a commutator 12 comprising a plurality of contact pieces electrically connected to the conducting elements, which are formed in the example in question by wires, of the armature winding 8.

A group of brushes 13 and 14 is provided for supplying power to the armature winding 8, one of the brushes 13 being connected to the earth of the device 1 and another of the brushes 14 being connected to a contractor 17. The brushes are for example four in number.

The brushes 13 and 14 rub on the commutator 12 when the rotor 2 is rotating.

The starting device 1 further includes a starter element 19 mounted so as to slide on a driveshaft 18 and able to be rotated about the X axis by the rotor 2.

A speed reduction assembly 20 may be interposed between the rotor 2 and the driveshaft 18, in a manner known per se.

The starter element 19 comprises a drive element formed by a pinion 21 and intended to be engaged on a drive member 33 of the internal combustion engine.

This drive member is for example a ring gear.

The starter element 19 further includes a freewheel 22 and a pulley washer 23 defining between them a groove 24 for accommodating the end 25 of a fork 27.

This fork 27 is made for example by molding a plastic.

The fork 27 is actuated by the contractor 17 in order to move the starter element 19 relative to the driveshaft 18, along the X axis, between a first position in which the starter element 19 drives the internal combustion engine via the pinion 21 and a second position in which the starter element 19 is disengaged from the ring gear 33.

The contractor 17 comprises a terminal 29 connected via an electrical connection element, especially a wire 30, to a power supply of the vehicle, especially a battery 26.

Various embodiments of the inductor coil 5 according to the invention will now be described.

Figure 2:
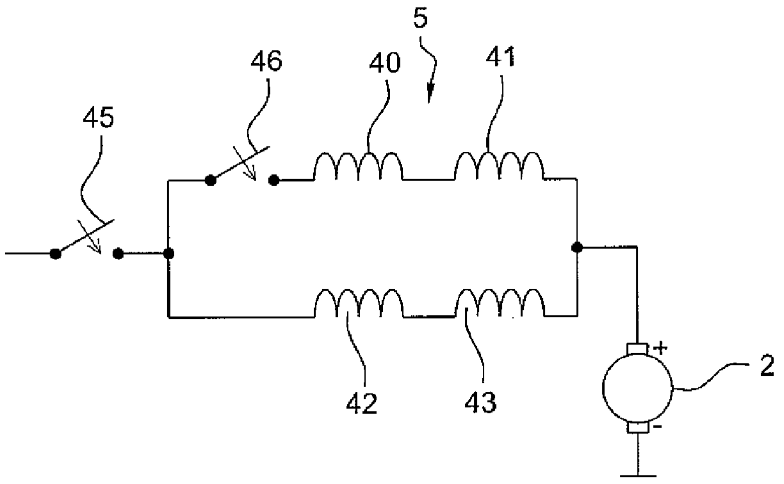
FIGS. 2 to 4 show, schematically and in part, three examples of an inductor coil of an electric motor for the starting device of FIG. 1.

In the embodiment illustrated in FIG. 2, the inductor coil 5 comprises four windings 40 to 43 forming two parallel groups, each consisting of two windings 40, 41 and 42, 43 in series.

The contactor 17 has a longitudinal axis Y and comprises two switches 45 and 46.

The first switch 45 is connected in series with the two groups of windings 40, 41 and 42, 43 and the second switch 46 is connected in series with the windings 40, 41 and in parallel with the windings 42, 43.

The contractor 17 is designed so that, in a prerotation phase, the switch 45 is closed and the switch 46 is open so as to allow only the windings 42, 43 to be supplied by the battery 26.

In other words, only half of the inductor coil 5 is activated.

The invention makes it possible to reduce the peak torque while the starter element 19 is in position, tooth against tooth, on the ring gear 33 and thus eliminate the risk of milling, as explained later.

When the starter element 19 is engaged in the ring gear 33 in a full-speed second phase, beyond the tooth-against-tooth position, the contractor 17 supplies power to all of the windings 40 to 43 of the inductor coil 5 in order to start the internal combustion engine.

In this full-speed second phase, the two switches 45 and 46 are in the closed state.

Figure 3:
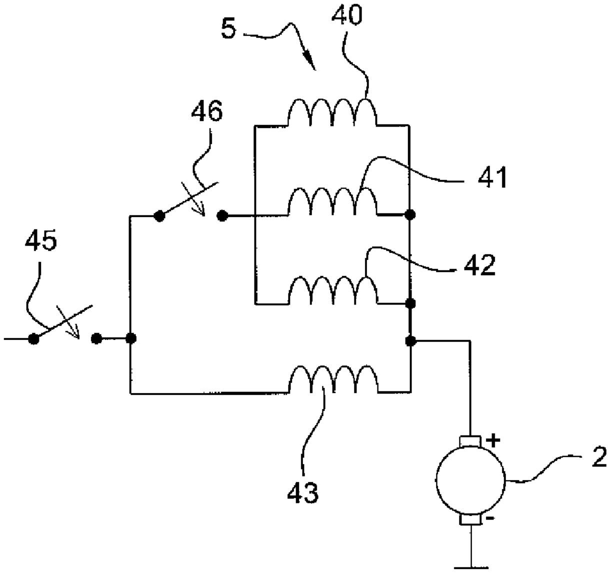

In another embodiment of the invention described with reference to FIG. 3, the windings 40 to 43 are placed all parallel, forming four parallel pathways.

The switch 46 is placed in series with the group of three parallel-connected windings 41 to 42.

Thus, in the prerotation first phase, only the winding 43 is activated, whereas all four windings 40 to 43 are activated in the full-speed second phase.

Figure 5:
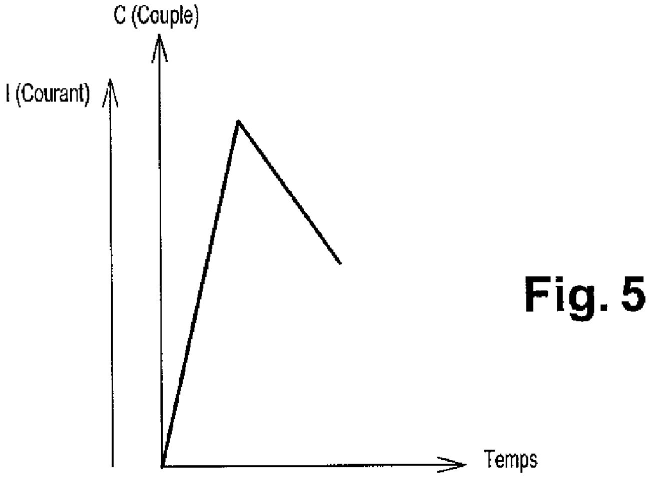
FIG. 5 illustrates schematically the variation in torque and current as a function of time during operation of the electric motor of FIG. 3.

The inductor coil 5 having four parallel pathways makes it possible to reduce, apart from the peak torque, also the peak current, as illustrated schematically in FIG. 5.

In particular, compared with a starter operating with a single power contact, the peak current can be reduced by a factor of between 1 and 3, especially by a factor of about 2.

In the embodiments described with reference to FIGS. 2 and 3, the contractor 17 comprises switches 45 and 46 of electromechanical or mechanical type.

Figure 4:
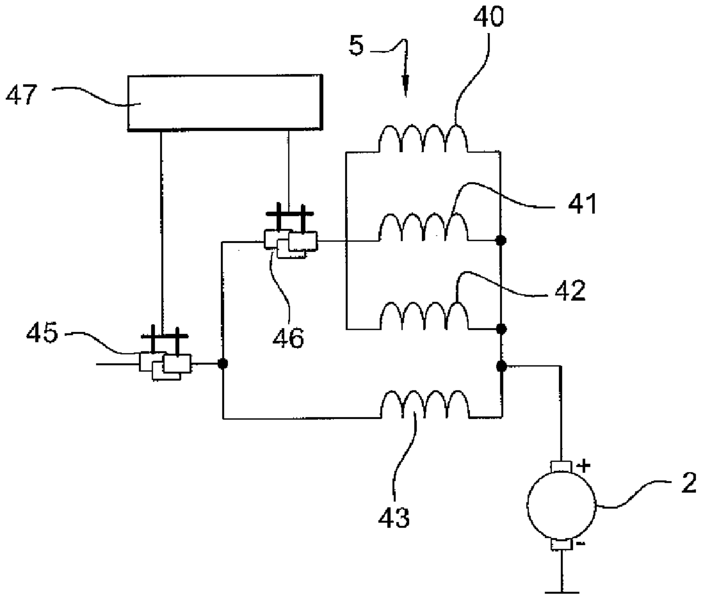

As a variant, the switches 45 and 46 may be of electronic type, as illustrated in FIG. 4.

For example, the switches 45 and 46 comprise transistors or thyristors, which are controlled by an electronic control module 47, for example a processor or a microcontroller.

In the embodiments described above, the prerotation phase is controlled by actuating the various windings of the inductor coil 5 at different times.

Figure 6:
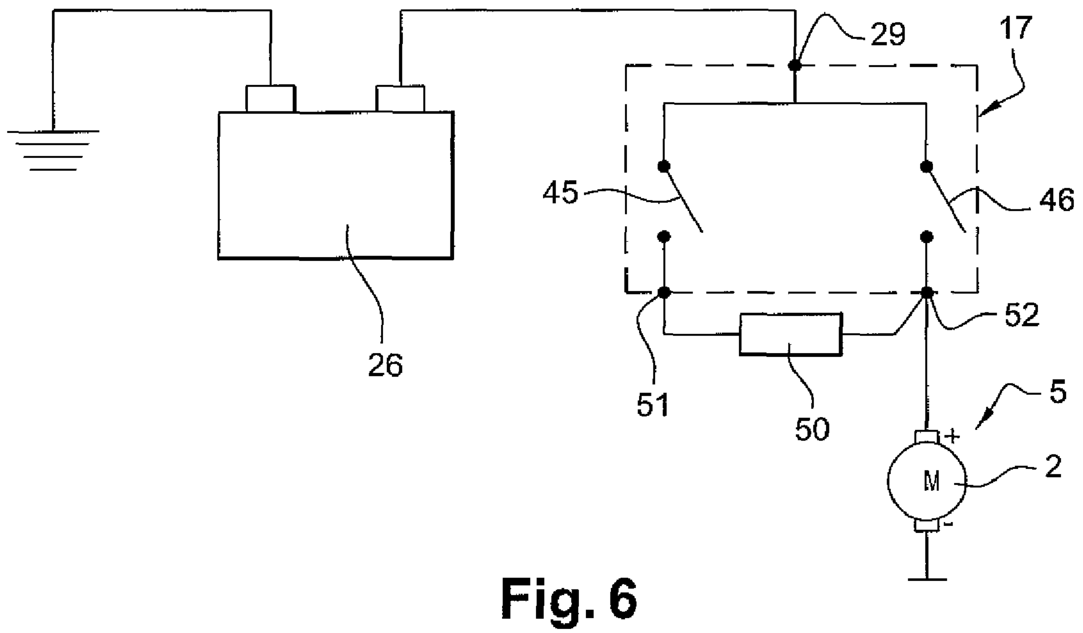
FIG. 6 shows, schematically and in part, an electric motor for the starting device according to another embodiment of the invention.

As a variant, as illustrated in FIG. 6, the inductor coil 5 comprises a single winding supplied by the battery 26 via switches 45 and 46.

The inductor coil 5 is connected in series with a power resistor 50.

The switch 45 is placed between the positive terminal 29 of the contractor 17, said terminal being connected to the battery 26, and an intermediate power terminal 51 connected, in the present case, to the power resistor 50.

When several pathways 40 to 43 in parallel are used, the terminal 51 is connected to the pathways that are activated in the prerotation first.

The switch 46 is placed, in parallel with the switch 45, between the terminal 29 connected to the battery 26 and a full-power electrical terminal 52 so as to be able, in the present case, to short-circuit the power resistor 50.

The power resistor 50 is placed between the intermediate-power terminal 51 and the full-power terminal 52.

In the prerotation first phase, the switch 45 is closed and the switch 46 is open, enabling the inductor coil 5 to be supplied through the power resistor 50 so as to reduce the peak torque.

In the full-speed second phase, also called the full-power phase, the two switches 45 and 46 are closed and the power resistor 50 is short-circuited, thereby enabling the inductor coil 5 to be supplied with full power.

An embodiment of a contractor 17 according to the invention, possibly combined for example with the inductor coil 5 of the embodiments shown in FIG. 2, 3 or 6, will now be described in greater detail with reference to FIGS. 7 to 13.

The contactor 17 comprises first and second electrical contact elements 58 and 59 intended to define the first and second switches 45 and 46 respectively. Each of the first and second contact elements 58, 59 is able to move along the longitudinal axis Y between an open state and a closed state. 2/19-20

The contractor 17 further includes a movable assembly 60 designed to move the starter element 19 by means of the pivoting fork 27, the movable assembly 60 comprising an actuating element 61 designed to close the second electrical contact element 59, as will be more clearly explained later.

The actuating element 61 is provided with a rod 62 fixed at one end to the fork 27 and having a head 63 at its opposite end.

The movable assembly 60 of the contractor 17 includes a movable core 65, the actuating element 61 being mounted therein and able to move relative to this movable core 65 against the force exerted by a helical spring 64.

This spring 64 is mounted around the rod 62 of the actuating element 61 and is applied at one end against the head 63 of said element.

The movable core 65 can move in the contractor 17 through the action of a magnetic field generated by a coil (not shown) of the contractor 17. This coil may comprise, if so desired, a pull-in winding and a hold-in winding, or, as a variant, only a single winding.

The second electrical contact element 59 is fastened, with the possibility of sliding, to a control rod 68, for example made of plastic, and the actuating element 61 of the movable assembly 60 is designed to be applied against the control rod 68 so as to be able to push the latter in order to make the second electrical contact element 59 pass from the open state to the closed state.

The first contact element 58 is supported, with the possibility of sliding, by a movable support 70, and the second contact element 59 is guided by moving in this support 70 for the first contact element 58.

Two springs 78 and 79 are conventionally provided on either side of the first contact element 58.

The support 70 has two guiding arms 77 extending on either side of the second contact element 59.

The contractor 17 comprises a fixed core 72, and a helical spring 73, also called a compression spring, is interposed between the second contact element 59 and the movable support 70 for the first electrical contact element 58 so as to make it possible, at least when the first contact element is activated and before activation of the second contact element, to apply the second electrical contact element 59 against the fixed core 72 of the contractor 17.

A second helical spring 74 is provided between the second contact element 59 and a shoulder 75 of the control element 68 so as, where appropriate, to keep the second contact element 59 in the closed state.

In its closed state, the first contact element 58 is applied against the terminals 29 and 51.

In its closed state, the second contact element 59 is applied against the terminals 29 and 52.

The contractor 17 is designed so that the second electrical contact element 59 is in the open state, while the starter element 19 is in the tooth-against-tooth position on the starter ring gear 33 of the internal combustion engine.

The terminal 29 connected to the battery 26 is staged so as to allow the first and second contact elements 58 and 59 to bear simultaneously on this terminal 29.

In the embodiment in question, the terminal 29 has a staged structure through the presence of a lug 80 offering an electrical contact face 81 (see in particular FIG. 8) at the same height as the full-power terminal 52.

As a variant, the staged structure may be obtained by machining the terminal 29.

The first and second electrical contact elements 58 and 59 each comprise an electrically conducting plate.

Where appropriate, the pull-in coil winding of the contractor 17 is short circuited only once the first and second contact elements 58 and 59 are in the closed state, so as in particular to ensure that there is no reopening by recoil of the movable core 65.

The operation of the contractor 17 will now be described in greater detail with reference to FIGS. 7 to 13.

Figure 7:
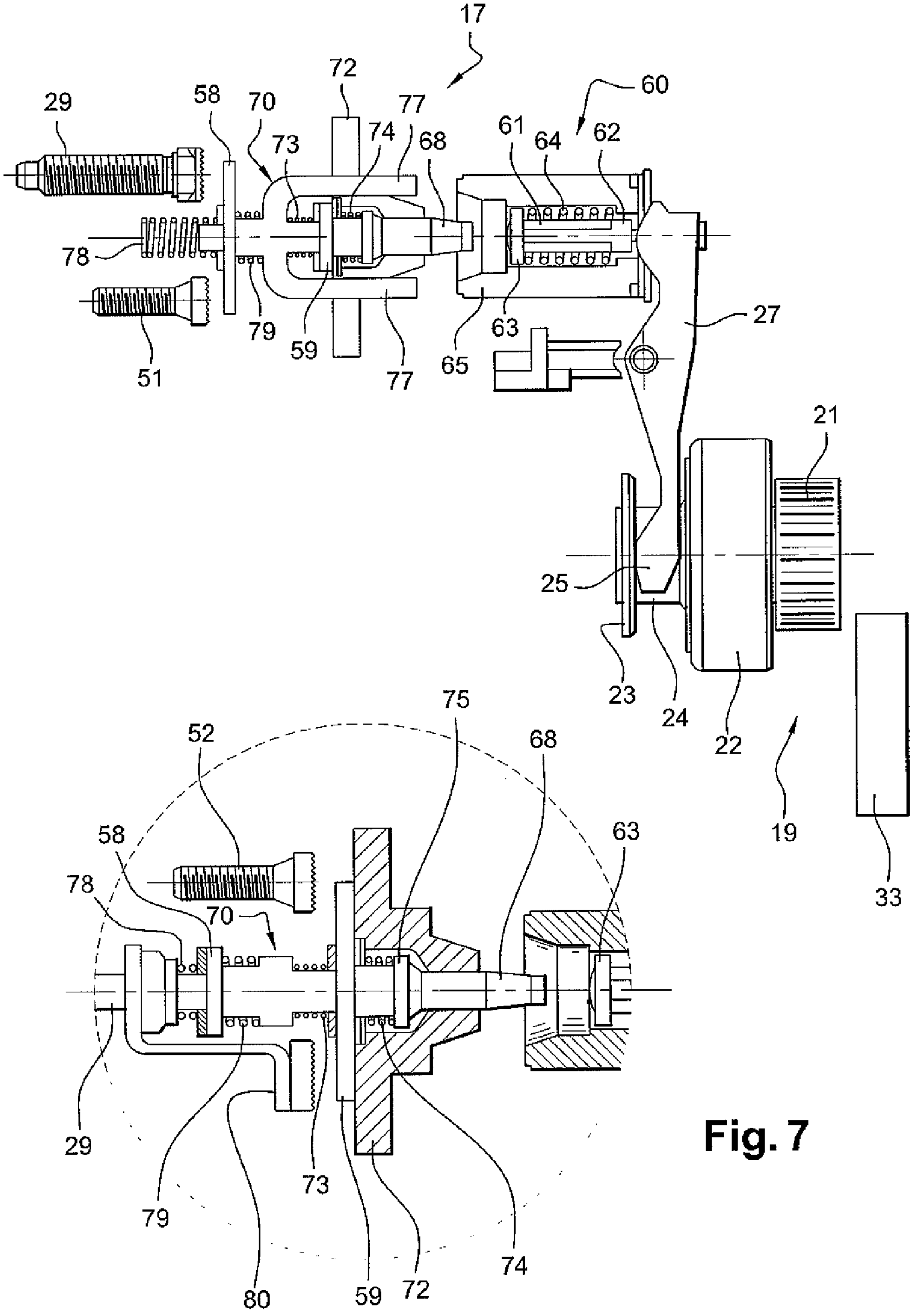
FIGS. 7 to 13 illustrate, schematically and in part, various steps in the operation of an electric motor contractor according to one embodiment of the invention.

Rest Phase (FIG. 7)

The contact elements 58 and 59 are in the open state, corresponding to the open state of the switches 45 and 46.

Figure 8:
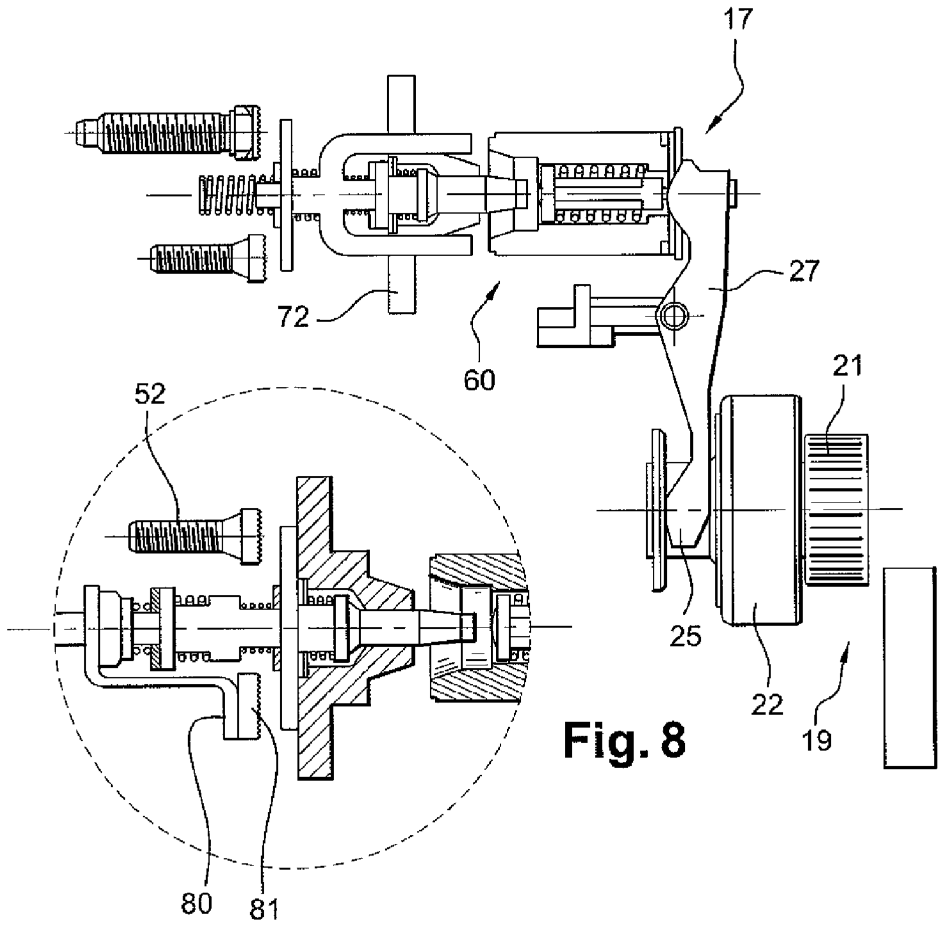

Clearance Take-Up Phase (FIG. 8)

The movable assembly 60 recoils slightly toward the fixed core 72 through the effect of the magnetic field exerted by the coil of the contractor.

The lower end 25 of the fork 27 is applied against the freewheel 22.

Figure 9:
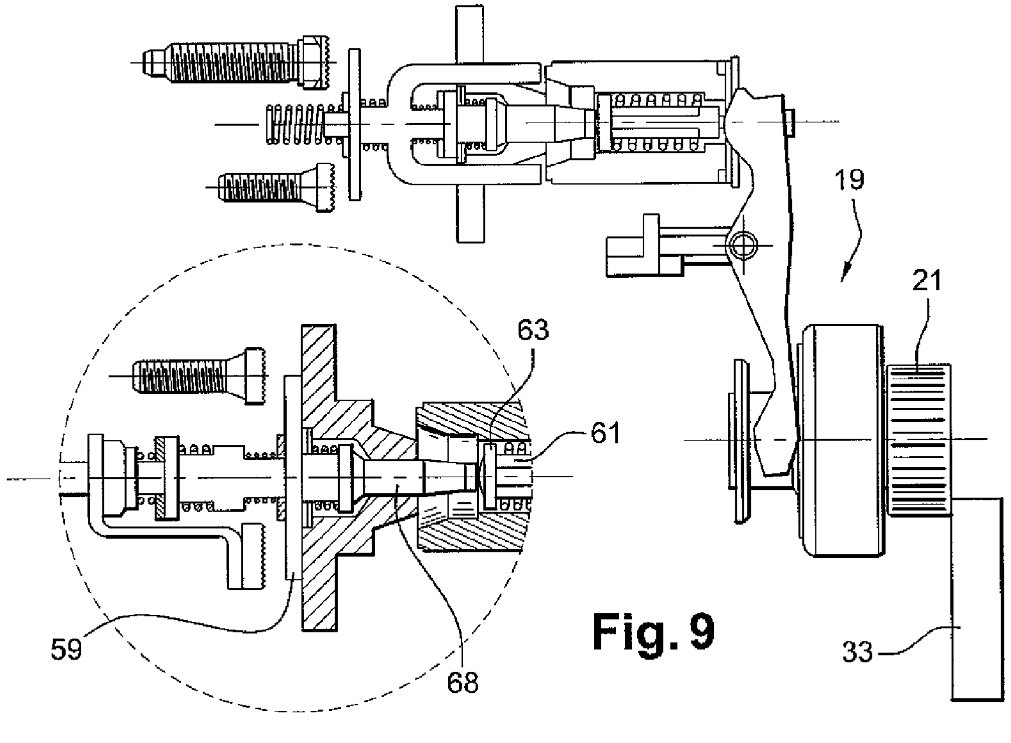

Tooth-Against-Tooth Position (FIG. 9)

The pinion 21 of the starter element 19 bears, tooth against tooth, on the ring gear 33.

Figure 10:
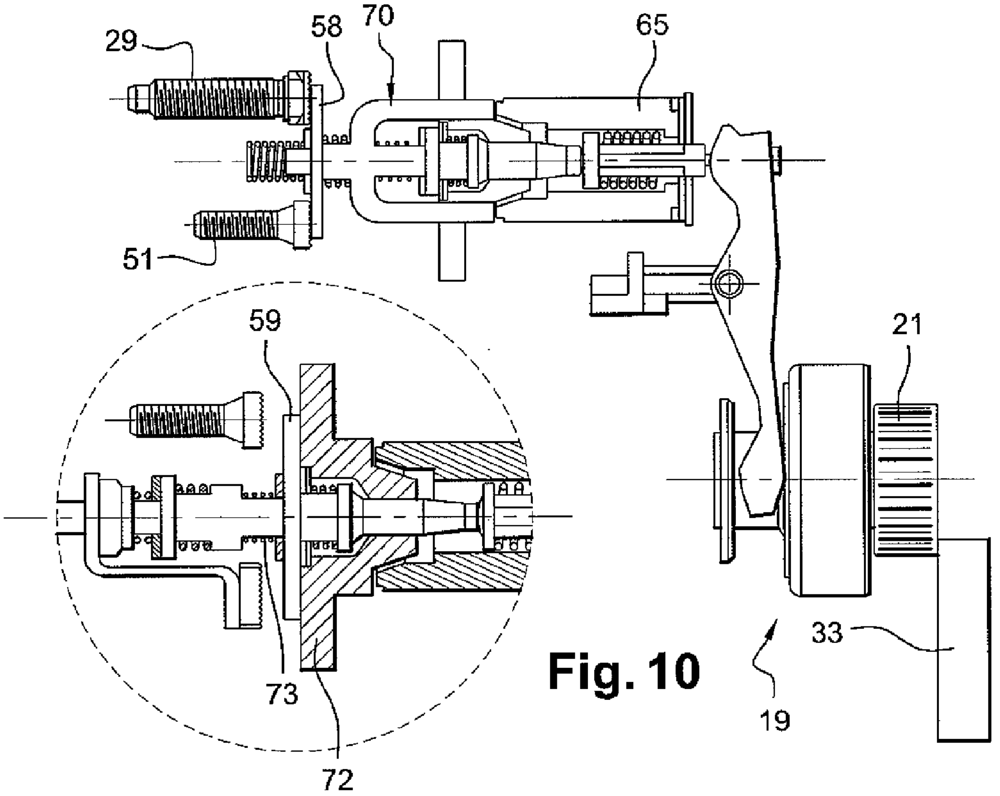

Closing Phase of the First Electrical Contact Element (FIG. 10)

The pinion 21 of the starter element 19 remains in position, tooth against tooth, on the ring gear 33.

The movable core 65 recoils against the support 70 for the first electrical contact element 58, which support 70 is moved rearward. This rearward movement causes the first contact element 58, bearing on the terminals 29 and 51, to close.

The second contact element 59 remains pressed against the fixed core 72 through the action of the spring 73.

Figure 11:
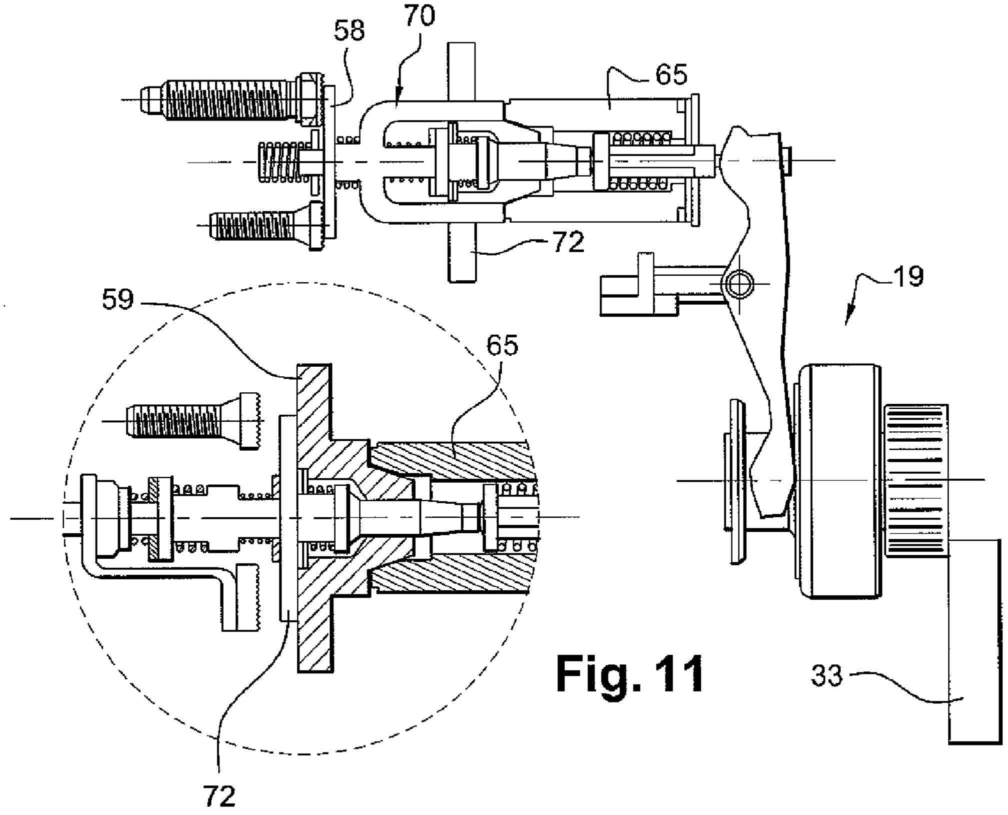

Magnetic Sticking Position (FIG. 11)

The pinion 21 of the starter element 19 remains in position, tooth against tooth, with the ring gear 33.

The support 70 continues to recoil relative to the fixed core 72.

The movable core 65 recoils and comes into contact with the fixed core 72.

The second contact element 59 remains pressed against the fixed core 72.

Figure 12:
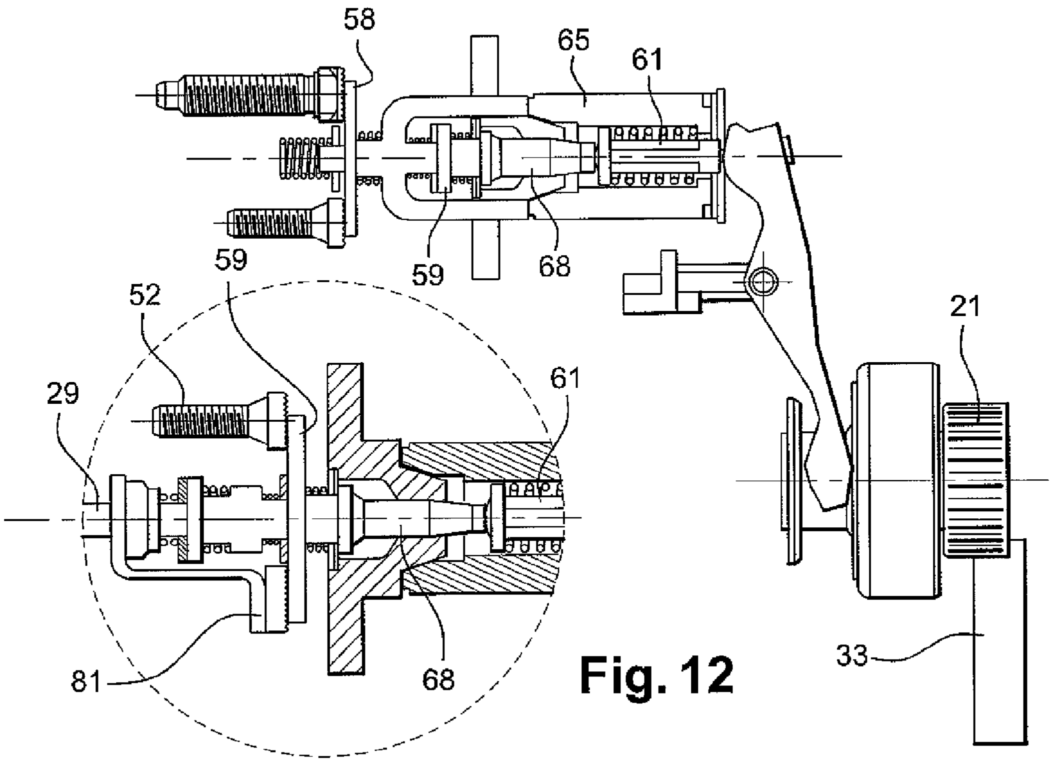

Closing Phase of the Second Electrical Contact Element (FIG. 12)

The pinion 21 of the starter element 19 engages in the ring gear 33 and the actuating element 61 recoils relative to the movable core 65.

Upon recoiling, the actuating element 61 pushes the control element 68 of the second contact element 59, which comes into contact with the terminal 52 and the lug 80 of the terminal 29.

The switch 46 is then closed.

Figure 13:
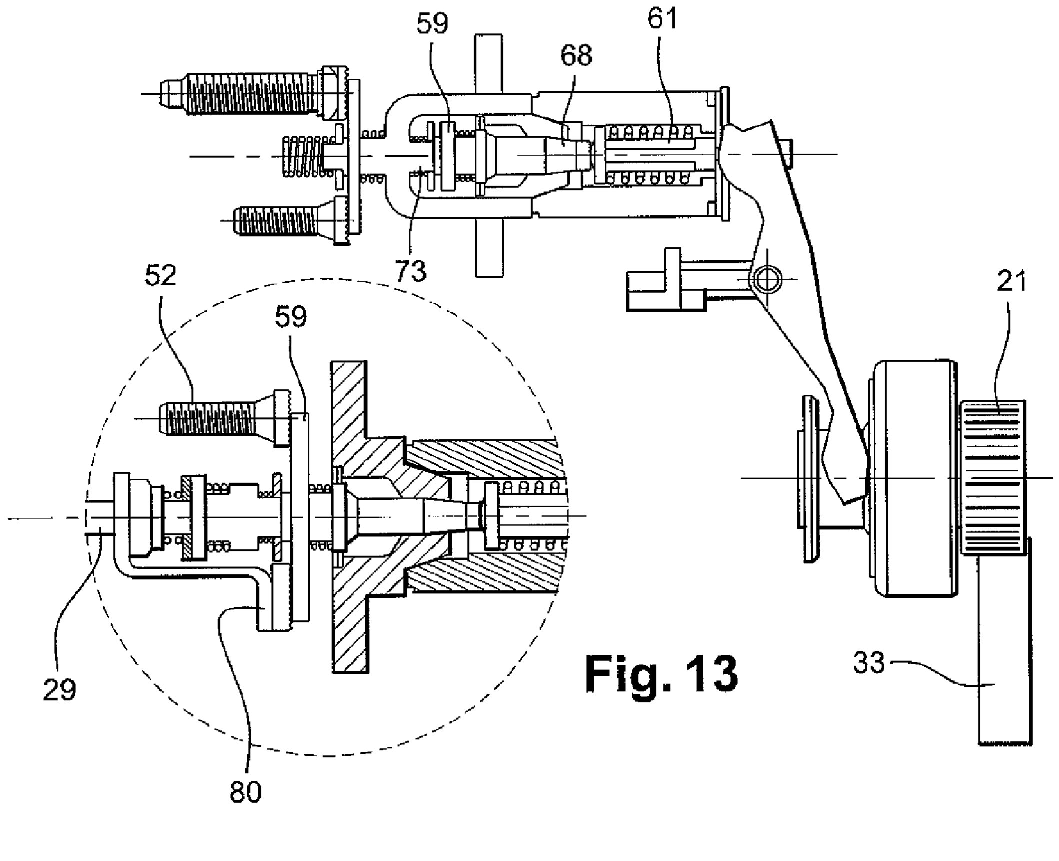

End-of-Travel Position (FIG. 13)

The actuating element 61 and the control rod 68 recoil as far as an end-of-travel position.

The spring 73 is compressed further.

Of course, the invention is not limited to the embodiments that have been described above.

For example, the support 70 may take the form of a cylinder of revolution coaxial with the control rod 68, which can slide inside this cylinder.

Again as a variant, the rod 68 is hollow and the support 70 may be designed to engage in this rod 68.

The invention claimed is:

1. A starting device for an internal combustion engine, comprising:

a stator comprising an inductor coil, the inductor coil comprising a plurality of windings electrically connected in parallel;

a rotor associated with the stator and having an axis of rotation;

a starter element rotatable by the rotor and moveable along the axis of rotation of the rotor; and a contactor provided to supply power, in a prerotation first phase, only to some of the windings of the inductor coil and, in a full-speed second phase, following the first phase, to all of the windings of the inductor coil;

the contactor having a longitudinal axis and comprising first and second electrical contact elements provided to supply power to the electric motor so as to enable the electric motor to operate in succession in the prerotation first phase and the full-speed second phase;

each of the first and second contact elements moveable along the longitudinal axis between an open state and a closed state;

the first contact element movable relative to the second electrical contact element;

the contactor comprising:

a movable support engaging the first electrical contact element;

a control rod engaging the second electrical contact element; and a movable assembly provided to push the movable support along the longitudinal axis so as to move the first electrical contact element from the open state to the closed state and to push the control rod along the longitudinal axis so as to move the second electrical contact element from the open state to the closed state;

the control rod movable relative to the movable support;

the number of the windings activated in the second phase being equal to or greater than twice the number of the windings activated in the first phase;

the movable assembly provided to move the starter element by a pivoting fork.

2. The device according to claim 1, wherein the contactor comprises electronic-type switches for activating the windings of the inductor coil.

3. The device according to claim 2, wherein at least one of the switches comprises a transistor or a thyristor.

4. The device according to claim 1, wherein the inductor coil comprises four windings in parallel, corresponding to four inductor pathways, and wherein, in the prerotation first phase, only one inductor pathway is activated and, in the full-speed phase, the four inductor pathways are activated.

5. A rotating electric machine for a motor vehicle, comprising a device according to claim 1.

6. The device according to claim 1, wherein the pivoting fork to move the starter element rotatable by the rotor along the axis of rotation of the rotor is actuated by the contactor in order to move the starter element relative to a driveshaft coupled to the rotor, along the X axis, between a first position in which the starter element is adapted to drive the internal combustion engine via the pinion and a second position in which the starter element is adapted to be disengaged from the ring gear; and wherein the movable assembly comprises:

a movable core movable in the contactor through the action of a magnetic field generated by a coil of the contactor provided to push the movable support; and an actuating element provided to close the second electrical contact element by pushing the control rod, mounted in the movable core and able to move relative to this movable core between an initial position and a final position against a force exerted by a helical spring, the actuating element being fixed to the pivoting fork to move the starter element to the first position to a second position and wherein the movable core can moves and pushing the movable without moves the actuating element by compressed the helical spring when the actuating member is blocked between the initial position and the final position.

7. A starting device for an internal combustion engine, comprising:

a stator comprising an inductor coil, the inductor coil comprising a plurality of windings;

a rotor associated with the stator and having an axis of rotation;

a starter element rotatable by the rotor and moveable along the axis of rotation of the rotor; and a contactor provided to supply power, in a prerotation first phase, only to some of the windings of the inductor coil and, in a full-speed second phase, following the first phase, to all of the windings of the inductor coil;

the contactor having a longitudinal axis and comprising first and second electrical contact elements provided to supply power to the electric motor so as to enable the electric motor to operate in succession in a prerotation first phase and a full-speed second phase, each of the first and second contact elements moveable along the longitudinal axis between an open state and a closed state;

the first contact element movable relative to the second electrical contact element;

the contactor comprising:

a movable support engaging the first electrical contact element;

a control rod engaging the second electrical contact element; and a movable assembly provided to push the movable support along the longitudinal axis;

the control rod movable relative to the movable support;

the number of the windings activated in the second phase being equal to or less than twice the number of the windings activated in the first phase.

8. A starting device for an internal combustion engine, comprising:

a stator comprising an inductor coil, the inductor coil comprising a plurality of windings;

a rotor associated with the stator and having an axis of rotation;

a starter element rotatable by the rotor and moveable along the axis of rotation of the rotor; and a contactor provided to supply power, in a prerotation first phase, only to some of the windings of the inductor coil and, in a full-speed second phase, following the first phase, to all of the windings of the inductor coil;

the contactor having a longitudinal axis and comprising first and second electrical contact elements provided to supply power to the electric motor so as to enable the electric motor to operate in succession in a prerotation first phase and a full-speed second phase, each of the first and second contact elements moveable along the longitudinal axis between an open state and a closed state;

the first contact element movable relative to the second electrical contact element;

the contactor further comprising a movable support engaging the first electrical contact element, a control rod engaging the second electrical contact element and a movable assembly provided to push the movable support along the longitudinal axis so as to move the first electrical contact element from the open state to the closed state and to push the control rod along the longitudinal axis so as to move the second electrical contact element from the open state to the closed state;

the number of the windings activated in the second phase being equal to or less than twice the number of the windings activated in the first phase.

9. The starting device according to claim 8, wherein the movable support is coaxial with the control rod.

10. The starting device according to claim 9, wherein the first contact element is supported by the movable support; wherein the second electrical contact element is fastened to the control rod; and wherein the second contact element and the control rod are both movable relative to the movable support.

* * * * *